United States Patent [19]

Imanaka et al.

[11] Patent Number: 5,195,083
[45] Date of Patent: Mar. 16, 1993

[54] DISC-SHAPED RECORDING MEDIUM CAPABLE OF RECORDING DATA SIGNALS BY MEANS OF LIGHT BEAM

[75] Inventors: Ryoichi Imanaka, Hirakata; Akira Kagata, Neyagawa, both of Japan

[73] Assignee: Matsushita Electric Industrial Co., Ltd., Osaka, Japan

[21] Appl. No.: 708,929
[22] PCT Filed: Jun. 5, 1984
[86] PCT No.: PCT/JP84/00288
§ 371 Date: Feb. 7, 1985
§ 102(e) Date: Feb. 7, 1985
[87] PCT Pub. No.: WO84/04992
PCT Pub. Date: Dec. 20, 1984

[30] Foreign Application Priority Data

Jun. 7, 1983 [JP] Japan .................. 58-102068

[51] Int. Cl.$^5$ .................. G11B 7/24; G11B 7/007
[52] U.S. Cl. .................. 369/275.4; 369/275.1; 369/275.3; 369/18; 369/16; 369/44.13
[58] Field of Search .................. 369/275.1–275.5, 369/284, 16, 17, 18, 44, 46, 32, 33; 346/135.1, 76 L

[56] References Cited

U.S. PATENT DOCUMENTS

| | | | |
|---|---|---|---|
| 2,047,860 | 7/1936 | Boer | 369/17 |
| 3,569,636 | 3/1971 | Schuller | 369/16 |
| 3,662,363 | 5/1972 | Chertok | 369/33 |
| 3,737,589 | 6/1973 | Redlich et al. | 369/17 |
| 3,860,766 | 1/1975 | Mori | 369/17 |
| 3,952,146 | 4/1976 | Plows et al. | 369/16 |
| 3,992,593 | 11/1976 | Heine | 369/18 |
| 4,310,916 | 1/1982 | Dil | 369/275 |
| 4,569,038 | 2/1986 | Nagashima et al. | 369/44 |

FOREIGN PATENT DOCUMENTS 1125180 6/1982 Canada .

OTHER PUBLICATIONS

John Eargle, "Sound Recording", 1980, p. 311.
Laming et al., Optical Storage of Data on a Magnetic Medium, IBM Tech. Disc. Bulletin, vol. 23, No. 7B, p. 3319, Dec. 1980.
Dil et al., "Control of Pit Geometry on Video Disks", applied optics, vol. 18, No. 18, Sep. 15, 1979, pp. 3198–3202.
Okimo et al., "Developments in Fabrication of Optical Disks", SPIE, vol. 329, Optical Disk Technology )1982) pp. 236–241.

Primary Examiner—Hoa Nguyen
Attorney, Agent, or Firm—Wenderoth, Lind & Ponack

[57] ABSTRACT

A disc-shaped recording medium is used in a recording-/reproducing apparatus in which a light beam is arranged to scan along a groove formed as a concentrical or spiral recording track, to record or reproduce data. Additional data which has previously been recorded on the disc-shaped recording medium in the shape of irregularities, such as address data indicating each recording track, is previously recorded within the groove in the shape of substantially sinusoidal irregularities of an amplitude which is smaller than the depth of the groove. Thus, if new data is recorded over the additional data, it is possible to easily separate the additional data and the newly-recorded data from each other during reproduction, so that the recording density can be improved.

1 Claim, 6 Drawing Sheets

FIG. 7A
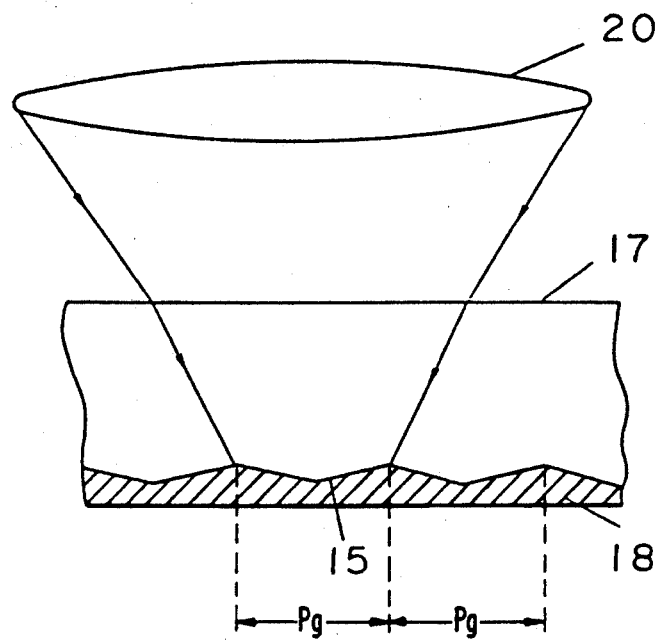
FIG. 7B
FIG. 7C
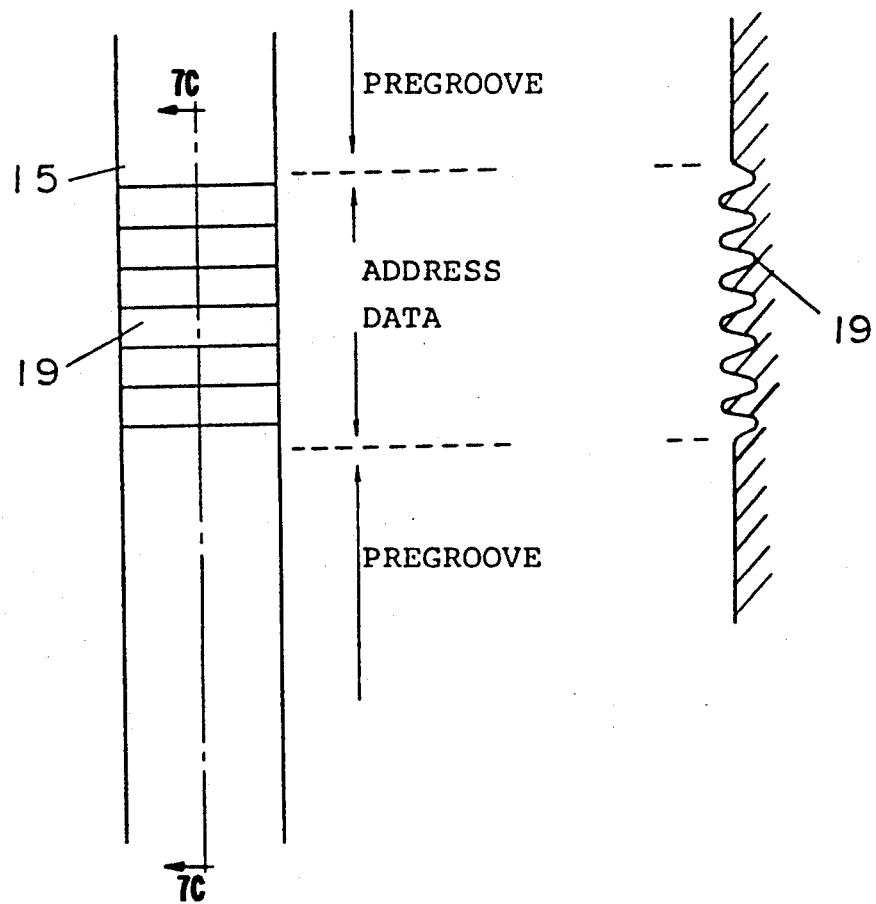

DISC-SHAPED RECORDING MEDIUM CAPABLE OF RECORDING DATA SIGNALS BY MEANS OF LIGHT BEAM

BACKGROUND OF THE INVENTION

1. Field of the Invention

This invention relates to a disc-shaped recording medium (thereinafter referred to as "disc") capable of recording data signals by means of a light beam, particularly to a disc possessing a concentrical or spiral groove formed in advance to serve as a recording track (hereinafter referred to as "pregroove"), which is characterized by the presence of additional signals such as an address data signal stored in advance on the pregroove.

2. Background of the Invention

A disc has been devised for use in a recording/reproducing apparatus adapted to record and reproduce data signals by means of a light beam. This disc possesses a pregroove formed in advance to serve as a recording track and has an address data signal identifying the pregroove and stored in advance in the shape of surface irregularities on the pregroove.

FIG. 1 is a model diagram illustrating in cross section a conventional pregrooved disc having an address data signal identifying the pregroove and stored in advance on the pregroove. In FIG. 1, 4 denotes a disc substrate made of a material such as transparent resin, 1, 2 respectively denote an address data part and a pregroove part formed on the disc substrate, and 3 denotes a recording medium layer. FIG. 2A is a plan view illustrating in the form of a model the recording medium layer 3 of the aforementioned disc.

In the conventional pregrooved disc, the address data has been formed in conjunction with the pregroove by intermitting the pregroove as illustrated. Thus, the depth of the pregroove part 2 and that of the address data part 1 have been identical.

When this pregrooved disc is rotated and the laser beam is caused to track the pregroove and keep impinging thereon and the reflected laser is read out, there is reproduced an address data signal in accordance with the surface irregularities of the address signal part 2 as illustrated in FIG. 3.

FIG. 2B is a cross-sectional diagram taken through FIG. 2A along the line 2B—2B, illustrating the pregroove part 2 and the address data part 1 as recorded in the form of surface irregularities on the disc substrate 4. They correspond to the reproduced address data signal and the pregroove illustrated in FIG. 3. As readily noted from FIG. 3, the address data signal recorded in conjunction with the pregroove on the conventional disc forms rectangular waves as illustrated in FIG. 3. The spectrum of the signal, therefore, is distributed in a very wide range. The spectrum of the reproduced address data signal illustrated in FIG. 4A, for example, is known to be distributed up to a very high frequency as illustrated in FIG. 4B.

When a signal is recorded on the conventional pregrooved disc possessing an address data signal, therefore, it is difficult for the data signal to be recorded by being superposed on the address data part 1. Even when the data signal is recorded somehow or other, it will be found difficult during the subsequent reproduction of the data signal to separate the address data signal recorded in advance and the data signal so recorded thereover.

Further, since the address data signal has been formed in conjunction with the pregroove by intermitting the pregroove, the tracking signal which is detected using the pregroove is degraded. Consequently, the signal to noise ratio of the tracking signal becomes lower.

SUMMARY OF THE INVENTION

The main object of this invention is to overcome the above-stated disadvantages. In achieving this object, according to the present invention, a disc is provided with a pregroove having an address data signal in a form of substantially sinusoidal surface irregularity on the pregroove.

BRIEF DESCRIPTION OF THE DRAWINGS

FIG. 7A is a cross-section illustrating a disc capable of recording produced by the aforementioned master disc;

FIG. 7B is a plan view illustrating an essential part of the disc;

FIG. 7C is a cross-section taken through FIG. 7B along the line 7C—7C; and

DETAILED DESCRIPTION OF THE PREFERRED EMBODIMENT

Figure 1:
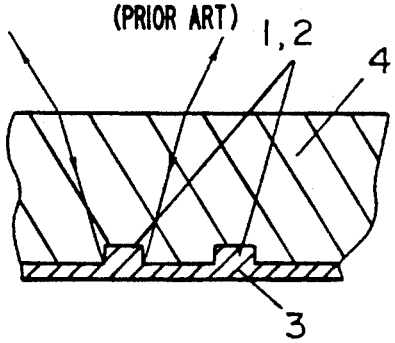
FIG. 1 is a cross-section of an essential part of a conventional pregrooved disc.
Figure 2A:
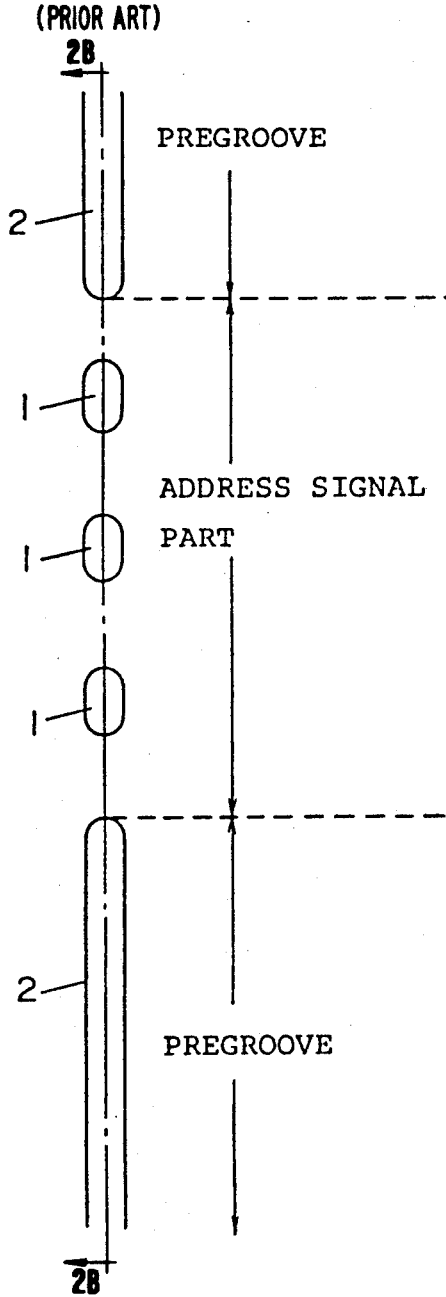
FIG. 2A is a plan view of the essential part of the same disc.
Figure 2B:
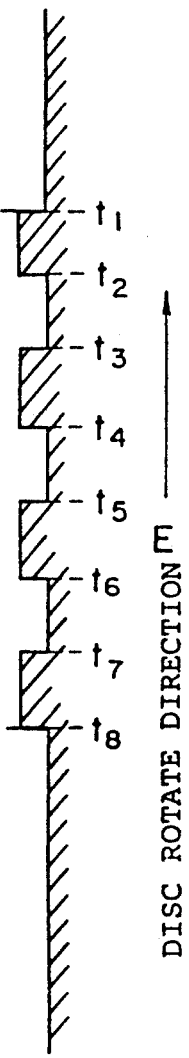
FIG. 2B is a cross-section taken through FIG. 2A along the line 2B—2B.
Figure 3:
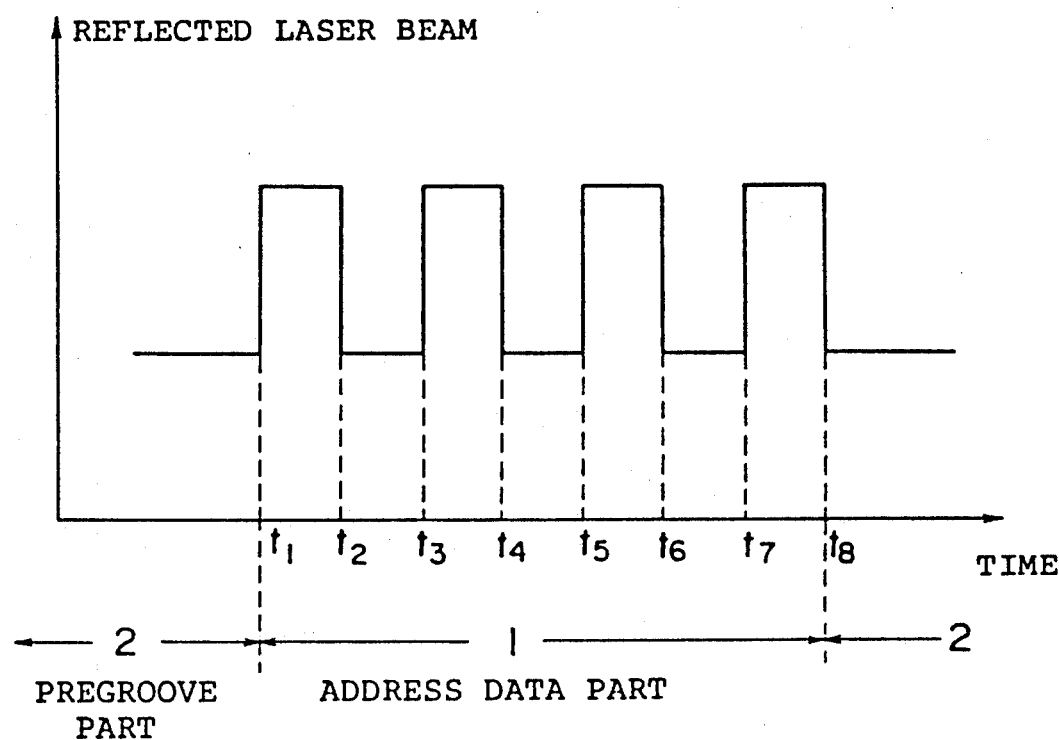
FIG. 3 is a diagram illustrating the waveform of a reproduced signal of an address signal from the disc.
Figure 4A:
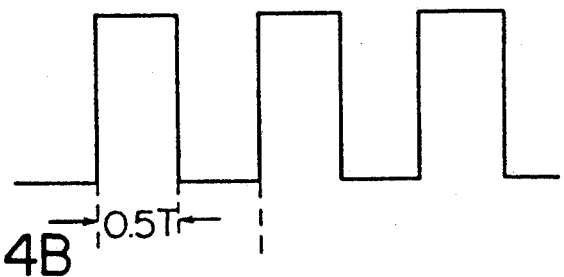
FIG. 4A is a diagram of the waveform of a reproduced address data signal in a rectangular waveform.
Figure 4B:
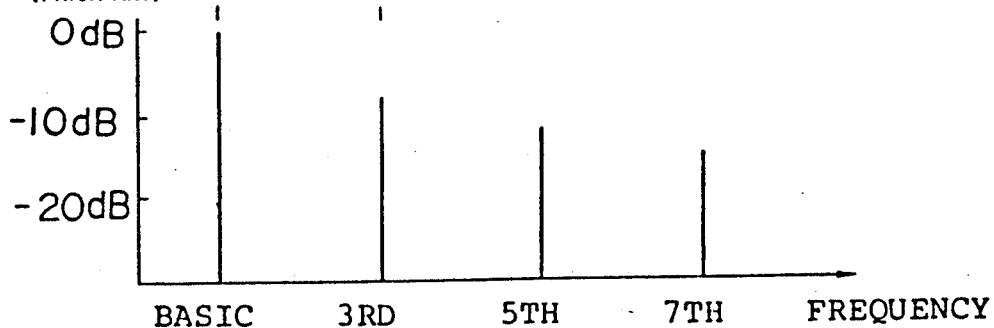
FIG. 4B is a diagram of a spectrum of the same reproduced address data signal.
Figure 5:
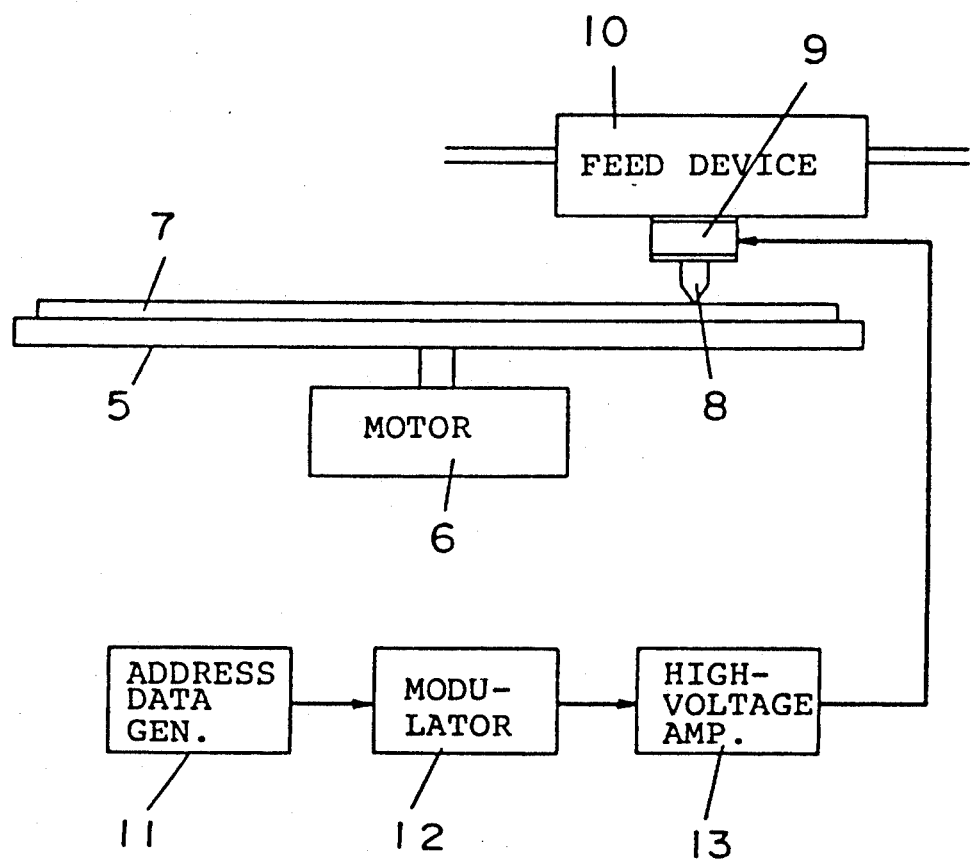
FIG. 5 is a block diagram illustrating a typical apparatus for producing a master disc for the disc of the present invention.

FIG. 5 is a block diagram illustrating a typical apparatus for producing a master disc for the disc of the present invention. A recording master disc 7 is rotated by a turntable 5 and a motor 6. This recording master disc 7 is produced, for example, by precision machining a disc of a metallic material such as copper so as to finish it with the surface smoothness of a mirror. Denoted by 8 is a cutting needle, which is generally a diamond needle. This cutting needle 8 is attached to a piezoelectric element 9, such as a ceramic electro-mechanical transducer, which in turn is fixed on a feed device 10. It is adapted to move in the radial direction of the recording master disc 7 as synchronized with the rotation of the recording master disc 7 to cut a spiral groove (pregroove) in the recording master disc 7. By the application of an additional signal voltage to the piezoelectric element 9 to modulate the movement of needle 8, the cutting needle 8 is enabled to displace in the vertical direction of the recording master disc 7 in response to the additional signal to effect recording of additional signals such as an address data signal.

Figure 6A:
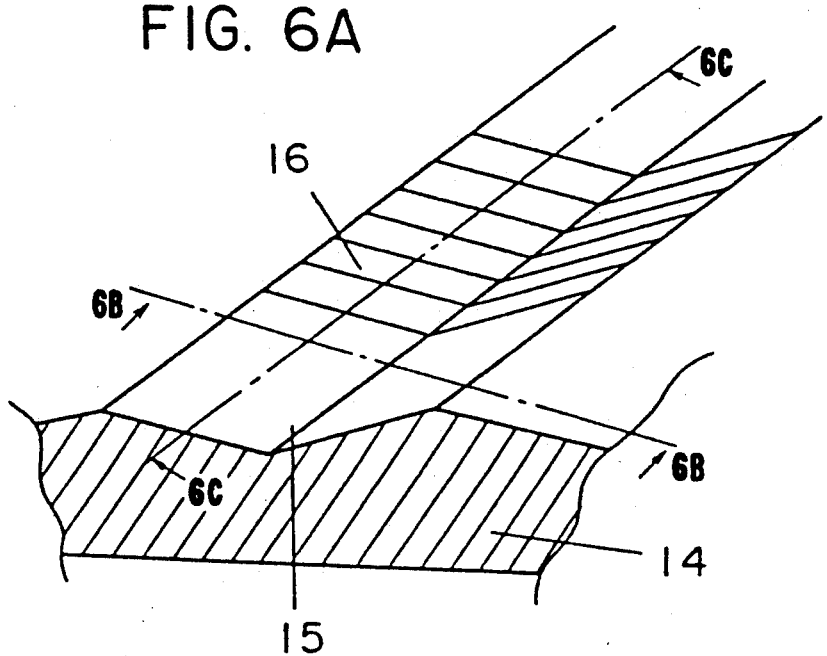
FIG. 6A is a perspective view illustrating an essential part of the master disc for the disc of the present invention.
Figure 6B:
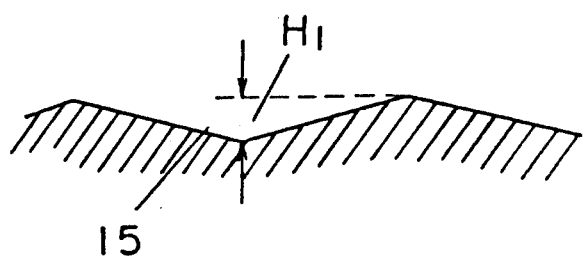
FIG. 6B is a cross-section taken through FIG. 6A along the line 6B—6B.
Figure 6C:
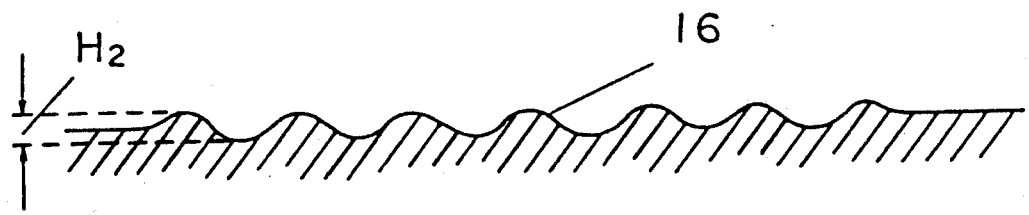
FIG. 6C is a cross-section taken through FIG. 6A along the line 6C—6C.

By 11 is denoted an address data signal generator. The output of this generator is modulated by a modulator 12. The modulated output signal is applied by a high-voltage amplifier 13 to the aforementioned piezoelectric element 9. FIG. 6 illustrates a typical recording master disc which has undergone the cutting (recording) effected by the apparatus for the production of the master disc illustrated in FIG. 5. FIG. 6A is a model diagram of the recording master disc as seen from the recorded surface side, illustrating a V-shaped pregroove 15 and an address data signal 16 cut on the master disc substrate 14. FIG. 6B is a cross-sectional diagram taken along line 6B—6B in FIG. 6A, illustrating a V-shaped pregroove 15 having a depth of H. FIG. 6C is similarly a cross-sectional view taken along line 6C—6C in FIG. 6A, illustrating an address data signal 16 cut in a sinusoidal waveform simultaneously with the pregroove 15. The address data signal 16 so cut has an amplitude of $H_2$. This amplitude of $H_2$ is smaller than the depth $H_1$ of the pregroove 15. It can be freely selected by suitably varying the gain of the high-voltage amplifier 13 illustrated in FIG. 5. Further, the depth $H_1$ of the pregroove can be freely selected by suitably selecting the shape of the cutting needle 8 and varying the needle pressure exerted upon the cutting needle 8. Based on this recording master disc obtained as described above, a disc capable of recording can be produced by the conventional mastering technique, for example, as indicated in SPIE Vol. 329, Optical Disk Technology (1982), page 251. This product is illustrated in FIG. 7.

FIG. 7A illustrates the construction of the disc of this invention capable of recording. By 17 is denoted a substrate for the disc. The substrate possesses a V-shaped pregroove 15 on the bottom surface. Denoted by 18 is a recording medium layer. FIG. 7B is a plan view illustrating an essential part of the aforementioned disc and FIG. 7C is a cross-sectional view taken along the line 7C—7C of FIG. 7B. An address data part 19 has the data recorded in a substantially sinusoidal waveform. A laser beam 20 forms a focal point on the pregroove 15. Each pregroove is indicated by Pg. By the use of a far field tracking servo, for example, the laser beam 20 is enabled to track the pregroove.

Figure 8:
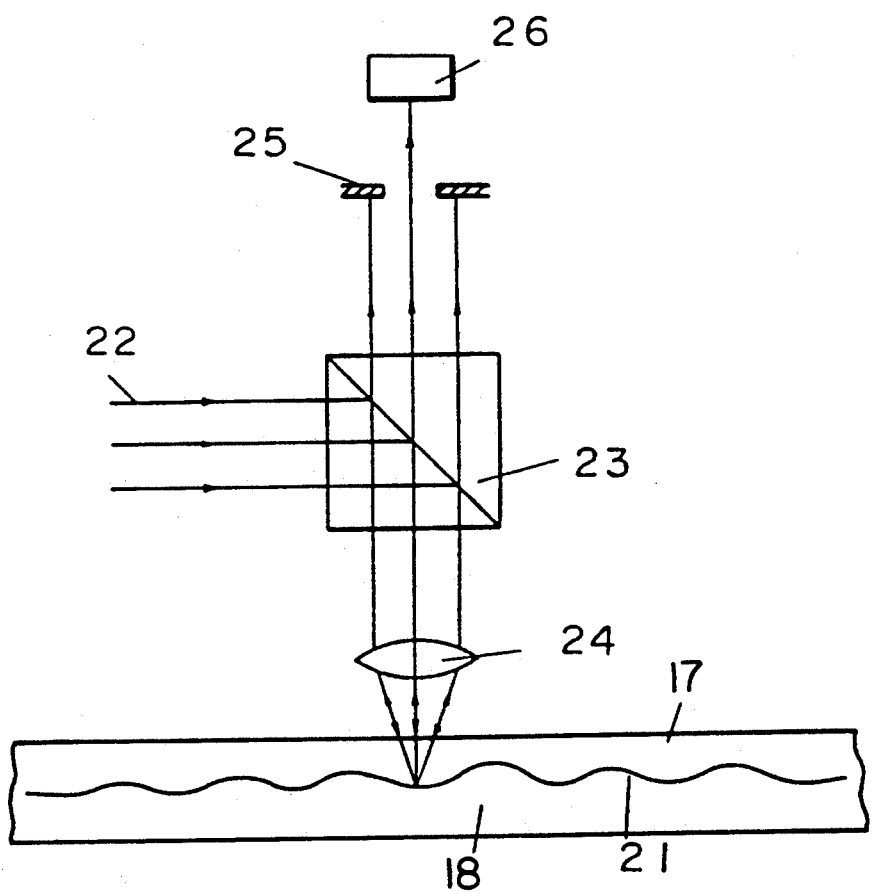
FIG. 8 is a diagram illustrating a construction of a typical reproducing device for the disc of the present invention.

The laser beam 20 which scans the pregroove 15 reproduces an address data from the address data part 19 by detection of the intensity of the refracted laser beam by a light detector. In this case, when the amplitude $H_2$ of the address data part described above is fixed at a value smaller than $\lambda/4 \times 1/N$, $\lambda$ denoting the wavelength of the aforementioned laser beam, the address data signal which is reproduced in the form of the reflected light of the laser beam assumes a substantially sinusoidal waveform. In the formula given above, N denotes the index of refraction of the disc substrate 17. FIG. 8 illustrates an optical system for reproduction. With reference to this diagram, the operation involved during the reproduction of the address data signal will be described in detail below. In FIG. 8, 21 denotes an address data part in a sinusoidal waveform which is formed by the top surface of the recording medium layer 18 on the bottom of the substrate 17, and corresponds to address data signal part 16 of FIG. 6. A laser beam 22 is passed through a beam splitter 23 and focussed on the surface of the address data part 21 with the aid of an objective lens 24. The reflected light issuing from the address data part 21 is passed through the beam splitter 23 and, with the size of the beam thereof limited by a shielding plate 25, is allowed to enter a light detector 26. As the size of the reflected beam from the address data part 21 varies in response to the form of the surface of the recording medium layer 18, the light detector 26 therefore obtains a signal in a substantially sinusoidal waveform modulated by the address data part.

So far, the present invention has been describe with reference to the pregroove and the address data signal. The additional signal which is recorded simultaneously with the pregroove is not limited to the address data signal. For example, a continuous signal of a fixed frequency may be recorded in conjunction with the pregroove, so that it may be utilized as a clock signal during the reproduction of recorded data. The cross-section of the pregroove is not limited to the V shape; it may be a trapezoid or a modification thereof.

INDUSTRIAL UTILITY

As described above, the disc in accordance with this invention permits other new data to be recorded as superposed on the part having the additional data such as the address data recorded in advance. Thus, the disc is allowed to utilize its limited surface area advantageously for recording and reproducing data. Moreover, the pregroove can be expected to provide stable tracking because it is not severed by additional data as experienced in the conventional countertype.

We claim:

1. A disc-shaped recording medium capable of having a data signal recorded thereon by using a light beam, said recording medium comprising:

a substrate having a concentric or spiral groove having a V-shaped cross-section preformed thereon which defines a recording track on which a data signal is recorded by irradiating said light beam onto the recording track, and having address data prerecorded on the surface of said groove for identifying a position of the recording track, said address data being on only a part of the length of said groove and being in the form of surface irregularities of a substantially sinusoidal waveform along the walls of said groove with an amplitude smaller than the depth of said groove, the walls of said groove other than where the address data is prerecorded having no sinusoidal surface irregularities; and a recording medium layer formed on said substrate.

* * * * *